Figure 1:
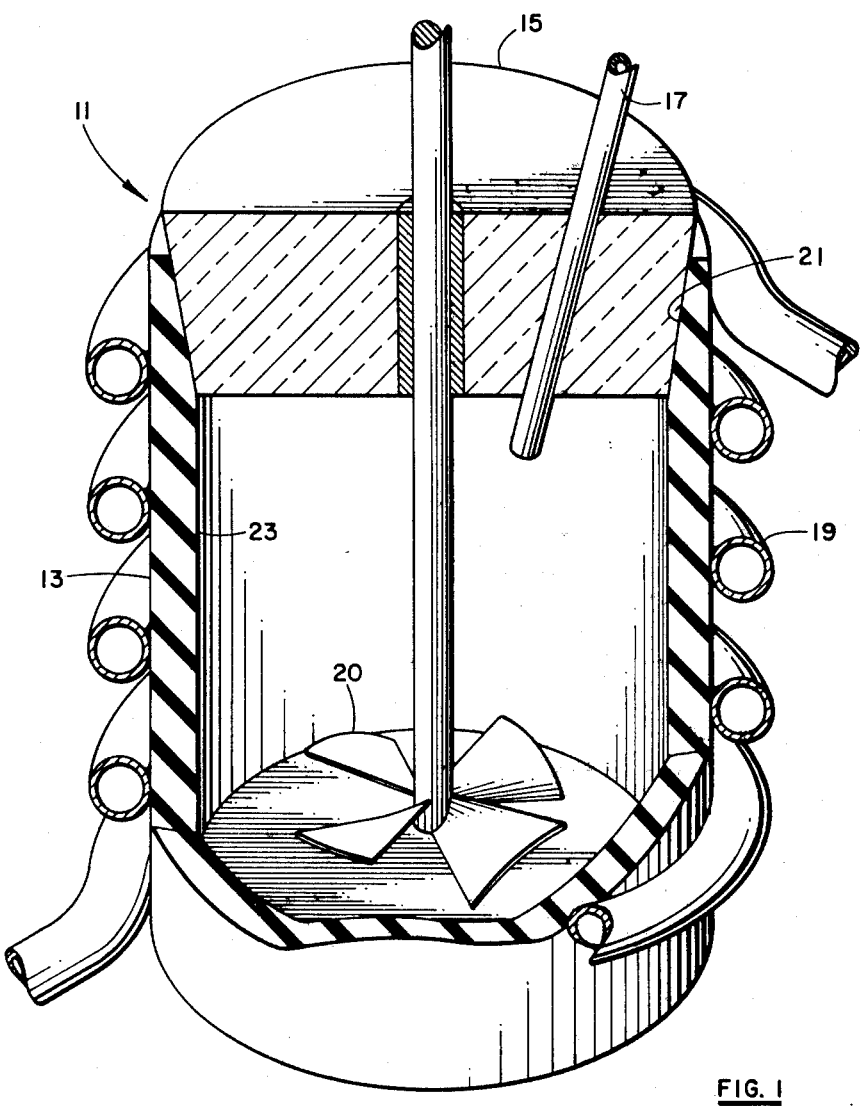

United States Patent
Herty, III

[11] 3,722,354
[45] Mar. 27, 1973

[54] PROPELLANT CASTING
[75] Inventor: Charles H. Herty, III, Waco, Tex.
[73] Assignee: North American Rockwell Corporation, El Segundo, Calif.
[22] Filed: Oct. 3, 1963
[21] Appl. No.: 314,836

[52] U.S. Cl. .................... 86/1, 102/98, 264/3
[51] Int. Cl. .................... C06b 21/02, F42b 9/14
[58] Field of Search ...... 86/1, 20, 20.2, 20.5; 102/98; 264/3, 302, 311; 259/18, 22, 23

[56] References Cited

UNITED STATES PATENTS

| | | | |
|---|---|---|---|
| 2,195,429 | 4/1940 | Shaler | 86/20.5 |
| 3,056,171 | 10/1962 | Fite | 102/98 |
| 2,361,382 | 10/1944 | Camine | 86/20.5 |
| 2,892,218 | 6/1959 | McGhee | 264/311 |
| 2,916,776 | 12/1959 | O'Neill et al. | 86/20.5 |
| 2,926,386 | 3/1960 | Hutchinson | 86/20.5 |
| 2,939,176 | 6/1960 | Adelman | 86/20.5 |

Primary Examiner—Benjamin A. Borchelt
Assistant Examiner—J. J. Devitt
Attorney—William R. Lane, Thomas S. MacDonald and Stuart W. Wohlgemuth

EXEMPLARY CLAIM

1. A method of preparing a solid propellant comprising:
   providing a vessel of polymeric material,
   individually pouring the separate ingredients for said solid propellant into said vessel,
   disposing in said vessel means for mixing said ingredients, mixing said ingredients in said vessel, and curing said ingredients in said vessel.

3 Claims, 2 Drawing Figures

PATENTED MAR 27 1973 3,722,354

INVENTOR.
CHARLES H. HERTY

BY Stuart W. Wohlgemuth
ATTORNEY

PROPELLANT CASTING

This invention relates to a method for mixing and curing sensitive solid propellants. More particularly, the invention relates to a method of mixing solid propellant providing for minimum amount of handling of the propellant.

A conventional composite solid propellant has two main ingredients: a fuel and an oxidizer, neither of which burns satisfactorily without the presence of the other. Usually solid propellants consist of crystalline, finely ground oxidizer, dispersed in the matrix of a fuel compound. The matrix is normally a polymerized organic compound. It includes compounds such as the various vinyl polyesters, polysulfides, polyurethanes, vinylpyridines, butadiene polymers and other types of polymers. The polymers are prepared by polymerization of lower molecular weight monomers. When used as a propellant fuel matrix, the polymers are cross-linked, or cured, by chemical reagents under elevated temperatures to form a high molecular weight rubbery mass. The cross-link process takes place after the oxidizer has been thoroughly dispersed throughout the matrix. Also often dispersed in the matrix of solid propellants of today are fine metal particles which serve as additional fuel, causing the combustion temperature to be higher and thus increasing the specific impulse. The metal powder may also increase the density of the grain and alleviates certain types of combustion instability. A further advance in the art of solid propellant technology is in the addition of metal hydrides to the matrix. The addition of hydrogen is beneficial to lower the exhaust gas molecular weight, which effectively increases specific impulse. Additionally they provide a more reactive propellant having somewhat higher impulse.

In the manufacture of the solid propellant, the proper proportions of the crystalline oxidizer which, for example, may be ammonium perchlorate, the matrix binder and the metallic fuel additive have to be carefully measured and the ingredients mixed thoroughly in suitable equipment. The mixing of the ingredients is accomplished by mechanical methods usually by the rotating of the blades in a mixing vessel. After thorough mixing in the mixing vessel, the propellants are then normally poured or scraped from the mixer into a casting mold to form the proper grain shape. The material can be cast directly into the combustion chamber which has been previously prepared or into special molds. To provide a required port area and proper burning surface, a metal mandrel is inserted into the mold. The mandrel is often coated with chemicals to prevent the cast propellant from sticking to it. To prevent the formation of air bubbles in the grain during the casting process, a vacuum of some type is applied. After casting the material in the mold, the propellant is cured; this normally involves a chemical reaction within the propellant. The time required for the chemical process depends on the curing temperature. The higher the temperature, the faster the curing.

Some of the highly reactive metal hydride fuels such as aluminum hydride and lithium aluminum hydride are extremely sensitive to friction, impact and heat. As a result, it is preferable during the preparation of the solid propellants containing such highly reactive and sensitive materials that a minimum amount of handling and transporting of the propellant mix transpire. The mixers in use today often are comprised of a shaft and blade attached thereto and inserted into a metal cylindrical vessel. The mixing blades often are inserted through the bottom or the sides of the vessel in which case the bearings for the shaft that supports the blades are exposed to the propellant mix. The friction on the submerged bearings could possibly cause ignition of the highly reactive previously mentioned type components causing explosion. Additionally, in sigma blade or dispersion blade mixers there is friction and impact forces resulting from severe wiping action of the blades. Some newer vessels have vertical mixing blades admitted from the top of the vessel. However, if there is misalignment of the mixer blades, the impact and friction resulting from the contact between the metal blades and the metal walls of the mixer could cause an ignition of the reactive material during the mixing. Admission to the danger of the mixing of the highly reactive material in the present day mixers is that it is sometimes hazardous merely to transport the material from the mixer into the casting mold. The mere friction of pouring and scraping the material from the mixer into the mold can additionally cause the highly reactive and sensitive material to ignite and result in an explosion of the mixture.

Thus, it is an object of this invention to provide a method of mixing solid propellants eliminating the need of pouring the mixed components into the casting mold.

Figure 2:
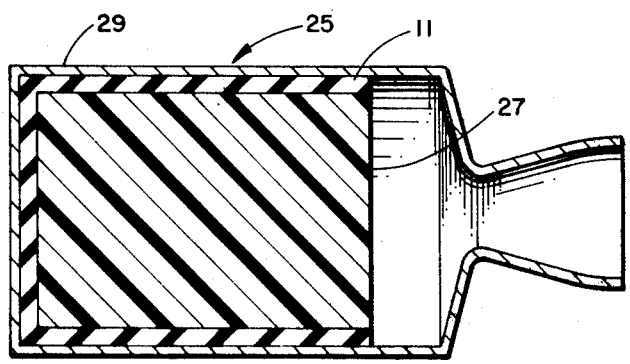

Another object of this invention is to provide a method of mixing solid propellant components having less danger to friction impact and heat sources. The above and other objects of the invention will be explained in detail with reference to the drawings in which:

FIG. 1 is a perspective view of a mixing cup that forms a novel basis of the method of this invention, FIG. 2 is a side-elevational view of a rocket motor incorporating the mixing cup.

The invention relates to replacing the conventional mixers in the mixing process for making the solid propellants with a cup or cylindrical container made of the material which will serve as a restrictor for the grain in its ultimate use.

The mixing container 11 or cup utilized in the method of this invention is shown in FIG. 1 and comprises a generally cylindrically shaped vessel 13 opened at one end with a stopper 15 therein. Through the stopper, the mixing blades 15 and vacuum line 17 can be admitted to the vessel. The vessel is made of a material which will serve as the inhibitor liner, insulator or restrictor for the grain. Most all solid propellant grains of today are provided with an inhibitor or restrictor about the outer circumference. The inhibitor is comprised of a compound which is relatively inert or which burns very slowly and is normally applied to the surface of the grain where burning is provided, particularly, the outer circumference. The inhibitors have been applied previously by dipping of the grain or by bonding sheets of the inhibitor material to the surfaces which are to be restricted or lapping with various types of tapes. Additionally, the inhibitor can be applied to the inner wall or surface of the combustion chamber. The inhibitor or restrictor about the outer circumference serves to restrict the heat transfer of the propellant to the wall of the chamber and prevents burning of the propellant from the outer circumference inward and serves additionally since the restrictor is of a rubbery material normally to bond the propellant to the motor case. In the method of the invention the constituents of the solid propellant are added to the cup 11 in their proper order while the vessel is heated by water passing through coils 19 surrounding it. The mixing blades 20 are then inserted and thorough stirring occurs until the constituents are thoroughly mixed. After the blades are removed, the cup with the material in it may then be placed in an oven where the propellant can be cured. When it is desired to have an internal port in the grain, a suitable metal mandrel coated with a chemical can be inserted in the uncured grain and removed from the grain upon completion of the curing step, leaving, for example, a star configuration or the like. After the curing, the cup 11 may be then coated with an adhesive and inserted in a metal rocket casing for bonding and subsequent firing. Alternatively, it should be obvious that the cup can be previously placed in the rocket motor casing previous to the mixing of the components.

As indicated in the FIG. 1, the open end of the vessel may be provided with internal tapers. The tapers 21 are standard to accommodate fitting or stopper 15 so that the mix may be deaerated by vacuum. When such tapers are provided, the mix only will generally fill the container not more than the area bounded by the straight sides of the internal walls 23 and the tapered portion of the walls can then be cut or removed from the cured propellant if desired.

The material for the cup 11 may be, for example, the same material already cured that comprised the matrix of the propellant. For example, it can be a polybutadiene polymer or carboxy-terminated polybutadiene or virtually any of the synthetic polymers. It is, of course, desirable and preferable that the basic component of the cup be the same polymer that is used in the matrix of the propellant mix. This will assure good bonding of the propellant to the cup. The cup will thus serve as a better restrictor in the rocket motor. The cup can be formed by placing the polymer which comprises it in a suitable mold corresponding to the shape of the cup and curing the polymer to form the desired configuration.

FIG. 2 discloses the incorporation of the mixing cup 11 in a solid propellant rocket motor 25. The cup 11 serves as a restrictor for the cured propellant 27 therein and can be bonded to the motor case 29. The cup 11 may be bonded to the metal casing 29 through the use of an adhesive or the like. Alternatively, the cup 11 could be made in situ within the motor casing 29.

It can be thus seen that the utilization of the mixing cup as described eliminates the hazard of metal bearings, metal-to-metal contact of blades against the sides of a metal container. The use of the particular cup in the propellant mixing and manufacture additionally eliminates the necessity for pouring and scraping the dangerous propellant from a mixer into a casting mold since the propellant is cast right in the mixing container or cup 11 which serves as the grain restrictor. This affords substantial advance in the safety of handling of highly reactive constituents in solid propellants.

EXAMPLE

A propellant formulation was made utilizing the process and apparatus of this invention. The device used was essentially that shown in the figures. In the process of making a solid propellant the first step was to set the water temperature through the coils in the cup or vessel at 170° F. 17.5 grams of binder ingredients were then added to the vessel. The binder was a nitroplasticized polynitramine-containing reactive end groups for cross-linking. The stirrer was then started and the binder ingredients mixed under vacuum until they all were dissolved. The mixer was then stopped and 6 grams of aluminum powder was added to the vessel. The stirrer was then started and the materials were mixed for 2 minutes. After the mixing of the aluminum powder in the mixture, 17.5 grams of the oxidizer which was ammonium perchlorate was added in two equal portions. After each portion, the composition was mixed under vacuum for 5 minutes. Following the mixing of the oxidizer, 9 grams of an energetic fuel, lithium aluminum hydride, was added in two equal portions. After the first portion was added to the vessel, the composition was mixed under vacuum for 5 minutes. Upon the second addition, the composition was mixed for 20 minutes under vacuum. After the mixing of the energetic fuel, the stirrer was removed from the vessel, vacuum was again connected and the vessel was vibrated for 30 minutes to thoroughly compact the ingredients. Upon completion of the vibration, the vessel was then put in an oven and cured for 48 hours at 120° F resulting in the solid propellant. The vessel was then placed in a metal rocket case or housing with a nozzle attached thereto and fired as a solid propellant motor. The mixing vessel used was a molded composition of synthetic rubber filled with asbestos powder to serve as an insulator for the rocket case.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A method of preparing a solid propellant comprising:
   providing a vessel of polymeric material,
   individually pouring the separate ingredients for said solid propellant into said vessel,
   disposing in said vessel means for mixing said ingredients mixing said ingredients in said vessel,
   and curing said ingredients in said vessel.

2. The method of forming a solid propellant rocket motor comprising:
   providing a vessel of polymeric material,
   individually pouring the separate ingredients for said solid propellant into said vessel,
   disposing in said vessel means for mixing said ingredients mixing said ingredients in said vessel,
   curing said ingredients in said vessel,
   and bonding said vessel into a metal housing with a nozzle attached thereto.

3. In a process for mixing solid propellants comprising:
   providing a mixing vessel, individually pouring the separate ingredients for said solid propellant into said vessel, disposing in said vessel means for mixing said ingredients mixing said ingredients in said vessel, the improvement which comprises mixing in a vessel made of a polymeric material which will form a restrictor for said propellant, and curing said propellant in said vessel.

* * * * *